US008755597B1

(12) United States Patent
Tantalo et al.

(10) Patent No.: US 8,755,597 B1
(45) Date of Patent: Jun. 17, 2014

(54) SMART FUSION OF VISIBLE AND INFRARED IMAGE DATA (75) Inventors: Theodore Anthony Tantalo, Rochester, NY (US); Kenneth Michael Brodeur, Webster, NY (US); Eric August Woodward, Rochester, NY (US); Timothy Paul Hahm, Hilton, NY (US); Angela Marie D'Orazio, Rochester, NY (US)

(73) Assignee: Exelis, Inc., McLean, VA (US)

( * ) Notice: Subject to any disclaimer, the term of this patent is extended or adjusted under 35 U.S.C. 154(b) by 666 days.

(21) Appl. No.: 13/033,663

(22) Filed: Feb. 24, 2011

(51) Int. Cl.
*G06K 9/00* (2006.01)

(52) U.S. Cl.
USPC ............ 382/162; 382/294; 382/284; 382/276

(58) Field of Classification Search
None
See application file for complete search history.

(56) References Cited

U.S. PATENT DOCUMENTS

| 6,690,011 | B2* | 2/2004 | Watanabe et al. ............. 250/330 |
| 7,620,265 | B1* | 11/2009 | Wolff et al. .................... 382/276 |
| 2002/0076089 | A1* | 6/2002 | Muramatsu et al. .......... 382/124 |
| 2003/0137593 | A1* | 7/2003 | Watanabe et al. ............. 348/274 |
| 2005/0259849 | A1* | 11/2005 | Pavlidis ......................... 382/118 |
| 2006/0238741 | A1* | 10/2006 | Ninomiya et al. ............ 356/5.01 |
| 2009/0051760 | A1* | 2/2009 | Ottney ............................ 348/53 |
| 2011/0235939 | A1* | 9/2011 | Peterson et al. ............... 382/266 |
| 2013/0236098 | A1* | 9/2013 | Fujisaki et al. ................ 382/171 |

OTHER PUBLICATIONS

Gonzalez, Rafael C. et al., "Digital Image Processing," Prentice Hall, New Jersey, pp. 598-600, 2002.

* cited by examiner

*Primary Examiner* — Sean Motsinger
(74) *Attorney, Agent, or Firm* — RatnerPrestia (57) ABSTRACT

A method combines two digital images, one in the visible range and the other in the infrared range. The combined image provides an intensity band of pixels and shows detected warm objects that are superimposed on the intensity band of pixels. A user of the present invention may (1) view increased detail in the fused image of a scene and (2) have high confidence that an object in the scene is warm or hot. Hot objects collected by the infrared channel, but not visible in the visible channel may also be seen by the viewer in the fused image.

18 Claims, 8 Drawing Sheets

SMART FUSION OF VISIBLE AND INFRARED IMAGE DATA

FIELD OF THE INVENTION

The present invention relates, in general, to a system and method for fusing two images for display to a user. More specifically, the present invention relates to a system and method for combining a thermal image in the infrared (IR) spectral region and a visual image in the visible spectral region. Each image includes a region of interest, or target, and background image data.

BACKGROUND OF THE INVENTION

When a scene is imaged with two (2) different cameras—each operating within different wavelength regions, one visible and one thermal (IR)—each image includes information not found in the other image. The visible image has a natural look users are accustomed to viewing based on the visual response of the human eye. The infrared image, which is effective in showing warm objects (such as humans, cars, or fires), however, does not look natural. When combining, or fusing, the image data, an attempt is made to create a single image that provides the user with more information than each of the single images.

There are various methods for combining image data from two different images. Generally, they may be divided into two categories, namely, spatial and frequency. Each of these categories may further be divided into local processing and global processing.

Spatial processing generally takes a portion of each image and forms an intensity band. Based upon local or global metrics, the intensity band may remain constant or may vary across the scene. On the other hand, frequency based processing generally decomposes spatial information into frequency bands. Then attempts may be made to merge high spatial content with high frequency content (because that is what makes up edges).

After the fused intensity band is generated, typical approaches of colorizing the scene are usually attempted. For example, a thermal imager viewing a scene may map input gray values to colors and treat the mapped output as a chrominance channel. Other approaches may use ratios of input bands, response characteristics of the human eye, or data clustering to select the output colors.

Typically, the final output colors of a scene obtained by a thermal imager may be difficult to interpret by a human observer. Specific cases of hot objects and color expectations of those objects are often not addressed and frequently ignored or overlooked. For example, selecting a color for a hot object in a visually dark region has not been considered. The final colors resulting from a thermal imager may 'ring', or look dim, gray and dull. The results may be poor, even after post processing techniques, such as sharpening or dynamic range adjusting.

When combining two images to form a single composite image, conventional methods take a percentage of one image and numerically add it to a percentage of a second image. These methods are called ratiometric combination methods. The composite image is then colorized. The problem with ratiometric combination and colorization methods is that the images tend to look dull and fail to adequately show warm or hot objects. The present invention addresses this problem, as will be explained.

SUMMARY OF THE INVENTION

To meet this and other needs, and in view of its purposes, the present invention provides a method for fusing two images. The method includes:

separately receiving (a) intensity values of a thermal image and (b) intensity values of a visual image;

separately adjusting contrast of (a) the intensity values of the thermal image and (b) the intensity values of the visual image;

combining (a) contrast adjusted intensity values of the thermal image and (b) contrast adjusted intensity values of the visual image, to form combined brightness values;

separating a target region from a background region in the thermal image;

assigning hue values to the target region in the thermal image, after separating the target region from the background region in the thermal image; and displaying a fused image, based on the assigned hue values obtained in the thermal image and the combined brightness values.

The method further includes transforming the combined brightness values and the hue values into the fused image having red, green and blue (RGB) color spaces.

Assigning hue values to the target region in the thermal image includes:

computing an ambient threshold value for the target region, assigning a hue value of zero to a pixel from the thermal image, if the pixel has an intensity value less than the ambient threshold value, and assigning a hue value of non-zero to a pixel from the thermal image, if the pixel has an intensity value greater than or equal to the ambient threshold value.

Assigning a hue value of non-zero to a pixel from the thermal image includes:

computing a quantized hue value, based on a number of steps between a lower hue value and an upper hue value, and the number of steps, the lower hue value and the upper hue value are controllable values.

The method may further include:

assigning saturation values to the target region in the thermal image, after separating the target region from the background region in the thermal image; and transforming the hue values, the saturation values, and the combined brightness values (HSB values) into the fused image having RGB color spaces.

Assigning saturation values to the target region in the thermal image includes:

computing an ambient threshold value for the target region, counting the number of pixels in the target region having intensity values greater than the ambient threshold value, and computing a saturation value for each pixel in the target region based on the counted number of pixels.

In addition, modifying the combined brightness values includes:

increasing the combined brightness values for pixels determined to be dark as the saturation values increase; and maintaining, without increase, the combined brightness values for pixels determined to be dark as the saturation values are close to zero.

Another embodiment of the present invention is an imaging system. The imaging system includes:

a camera providing a visual grayscale image, a camera providing a thermal grayscale image, and a processor for:

(a) combining the visual grayscale image and the thermal grayscale image to form a combined grayscale image, (b) separating, based on an ambient temperature value, target pixels from background pixels in the thermal grayscale image, (c) assigning a hue value for each of the target pixels, (d) assigning a saturation value for each of the target pixels, and (e) transforming the combined grayscale image into a final color image, based on the hue value and the saturation value assigned to each of the target pixels.

The processor includes a transform module for transforming the combined grayscale image into a red-green-blue (RGB) color space. The processor includes a beta module for modifying the combined grayscale image, based on the assigned saturation values in step (d).

The imaging system may include: a module for determining the ambient temperature value of the thermal grayscale image. The beta module lightens a dark pixel, when the dark pixel has a temperature value higher than the ambient temperature value.

The ambient temperature value includes a hot threshold or a cold threshold. The beta module lightens a dark pixel, when the dark pixel has a temperature value higher than the hot threshold, and the beta module lightens a dark pixel, when the dark pixel has a temperature value lower than the cold threshold.

Yet another embodiment of the present invention is a processor for combining two images. The processor includes:

a first contrast enhancement module for adjusting dynamic range of pixel intensities of a first image, a second contrast enhancement module for adjusting dynamic range of pixel intensities of a second image, a brightness fusion module for combining the pixel intensities of the first and second images to form a fused image, a threshold module for determining an ambient temperature value of the pixel intensities of the first image, and a beta module for modifying the pixel intensities of the fused image, based on ambient temperature values of the pixel intensities of the first image.

The processor may also include a saturation module for assigning saturation values for the pixel intensities of the first image, a hue module for assigning hue values for the pixel intensities of the first image, and a transformation module for transforming the fused image into red-green-blue (RGB) color spaces, based on the saturation and hue values.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figure.

DETAILED DESCRIPTION OF THE INVENTION

The present invention combines two images, for example, a visual image and an infrared image. The combined image includes a spatial intensity band that contains the best information from each image. The present invention detects and colorizes warm objects, such as humans and automobiles, and leaves non-warm objects gray, without color. It does this by processing the IR channel separately to find warm targets, while it simultaneously merges intensity bands together from the two images. After merging the intensity bands and detecting and processing the warm targets, the present invention performs a 'beta' operation and a transformation operation, converting hue-saturation-brightness (HSB) color spaces into red-green-blue (RGB) color spaces. The beta operation and the transformation operation are performed automatically without any user intervention.

The final image provided by the present invention includes fused spatial data from each band and colorized hot or warm objects with distinguished colors. In this manner, a viewer may see increased detail in the combined image and have high confidence that an object in the scene is warm or hot. The final image also includes warm or hot objects collected by the IR channel that may not be visible in the visual channel.

As will now be explained, the present invention includes an algorithm, or method for target extraction, contrast enhancement, intensity band combination, beta operation and color transformation operation. The method combines or fuses two separate images, preferably a visual image and a thermal image, and includes the following items:

The method processes the IR channel separately to extract target information focusing on human type of temperature signatures. The resulting output is a binary map that segments designated objects (or targets) from ambient or background. This approach is completely autonomous and operates under a wide range of conditions.

The method uses an image combination approach to generate the intensity band. A combination approach such as any one of the following may be used:

Ratiometric (Spatial);
Uniform fusion (Spatial);
Variance based fusion (Spatial);
Variance based fusion (Frequency), local and global.

The method colorizes only designated warm/hot pixels. All other intensity pixels remain unchanged. This results in the image remaining mostly grayscale and thereby not confusing viewers with extraneous misleading synthetic colors. The method also has the option of colorizing both hot and cold objects. In this latter option, the method colorizes designated warm/hot objects and cold objects. All other intensity pixels remain unchanged.

The method addresses situations in which the warm objects in the IR channel appear substantially white, but in the visible channel appear substantially black. These objects are remapped then colorized brighter. The remapping ensures vibrant colorization of these warm objects.

The method uses a dynamic range adjustment step to maximize contrast in each channel separately, prior to the merging the data from each channel. Improving contrast before intensity band fusion ensures improved contrast in the resultant image.

The method may use another dynamic range adjustment step for tonal correction, after brightness fusion to further increase contrast.

The method uses hue-saturation-brightness (HSB) as a preferred color space conversion. This allows color saturation to be easily controlled, while providing a 'color filter' effect for designated hot pixels.

Figure 1:
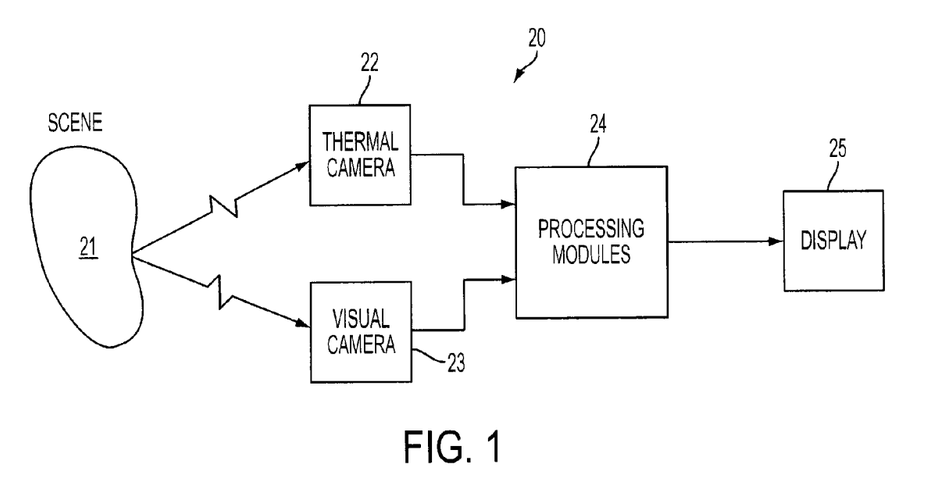
FIG. 1 is a block diagram of an image fusing system that combines an image provided by a thermal camera and another image provided by a visual camera, in accordance with an embodiment of the present invention.

Referring now to FIG. 1, there is shown an image fusion system, generally designated as 20, including thermal camera 22 and visual (or visible) camera 23 for imaging scene 21, the latter including objects of interest, or targets, and background information. The thermal camera may include a long wave infrared (LWIR) imager. The visual camera may include an image intensifier and associated optics that convert visible and near infrared (NIR) light into viewable images.

The targets may include, for example, one or more humans hiding in dense trees. Humans and hot objects such as vehicles and generators are considered targets herein while dense trees or open fields may be considered background information. Various processing modules 24 receive the image data from the thermal camera and the visual camera. The processing modules, which may reside in one microprocessor or multiple microprocessors, perform a method of the present invention, shown for example in FIG. 2 (described below). The fused image is provided to a user by way of display 25. The display may include a micro-display, a projection display, or a helmet mounted display.

The two imagers included in fusion system 20 use sensors that are different from each other, for example, the thermal camera uses IR detectors to generate an array of pixels and the visual camera uses detectors operating in the visible frequency band to generate another array of pixels. The two pixel arrays may have different sizes. In such case, the processing modules 24 may decimate or magnify one pixel array so that it matches the other pixel array. Alternatively, a portion of the larger pixel array may be ignored so that it matches the smaller pixel array.

Since the two sensors operate in different regions of the electromagnetic spectrum, features that are not visible in one sensor may be visible in the other sensor. The present invention, as embodied in FIG. 1, gracefully merges features in the visible channel with features in the IR channel, forming an image that is both informative and pleasing to the human viewer.

The inventors have discovered that colorizing an entire scene may cause confusion in interpreting the scene. The color mapping of a scene has different meanings to different viewers that may not be intuitive. For example, most viewers associate cold objects with the color blue and hot objects with the color red. The inventors' research has determined that the type of data viewed, the scene content, and the expected utility of the data should drive the color mapping choice of the scene.

One approach to color mapping a scene is to assign the pixels of an image one of two colors, depending on whether the objects are cold (e.g., blue, green, etc.) or hot (e.g., red, amber, etc.). Alternatively, pixels that are cold may be assigned an identical color to those that are ambient, in order to minimize colorization of cool night skies, for example. In order to ensure that the present invention accounts for all possible scenes, a series of utility cases was established, based on careful interpretation of user feedback. These utility cases, or input/output expectations, are shown in the following table.

| Generalized Pixel Condition | | | | | | |
|---|---|---|---|---|---|---|
| | Use Case | | | | | |
| | 1 | 2 | 3 | 4 | 5 | 6 |
| Visible | Dark (black) | Bright (white) | Dark (black) | Bright (white) | Dark (black) | Bright (white) |
| IR | Ambient (gray) | Ambient (gray) | Cold (black) | Cold (black) | Hot (white) | Hot (white) |
| Desired Output Pixel Expectation | Dark-gray, | Bright-gray, | Dark-gray, or Color #1 | Bright-gray, or Color #1 | Color #2 | Color #2 |

The utility cases shown in the above table are important, because three of the cases highlight difficult areas, specifically cases 3, 5 and 6. An image fusion system may tend to connect tonal information to either the visual or the IR modality. Using case 3 as an example, the image fusion system may display these pixels as black, even though there are feature information contained in the IR image. In the present invention, however, these pixels may be visible as dark-gray and/or may be colorized, thereby alerting the user to potentially dangerous targets or conditions in the scene.

The present invention provides a colorized fusion algorithm that merges imagery from both a visual sensor and a thermal (LWIR, for example) sensor to form a grayscale image that has temperature information overlaid as color. The color is provided using a hue-saturation-brightness (HSB) color model transformation (described later). The fusion process uses uniform spatial fusion to mix the data and create the tonal information, while thermal mapping uses the LWIR data to add the color information. Details of the merging of two images to form a combined grayscale image is described in U.S. patent application Ser. No. 12/846,086, which is incorporated herein by reference in its entirety.

Overall, the process is adaptive in nature, such that if a particular channel (visible or thermal) fails to give adequate signal, the method automatically adjusts the fused output toward the channel with more dynamic range. The method makes an implicit assumption that the array sizes and bit depths of the two input images are different.

Figure 2:
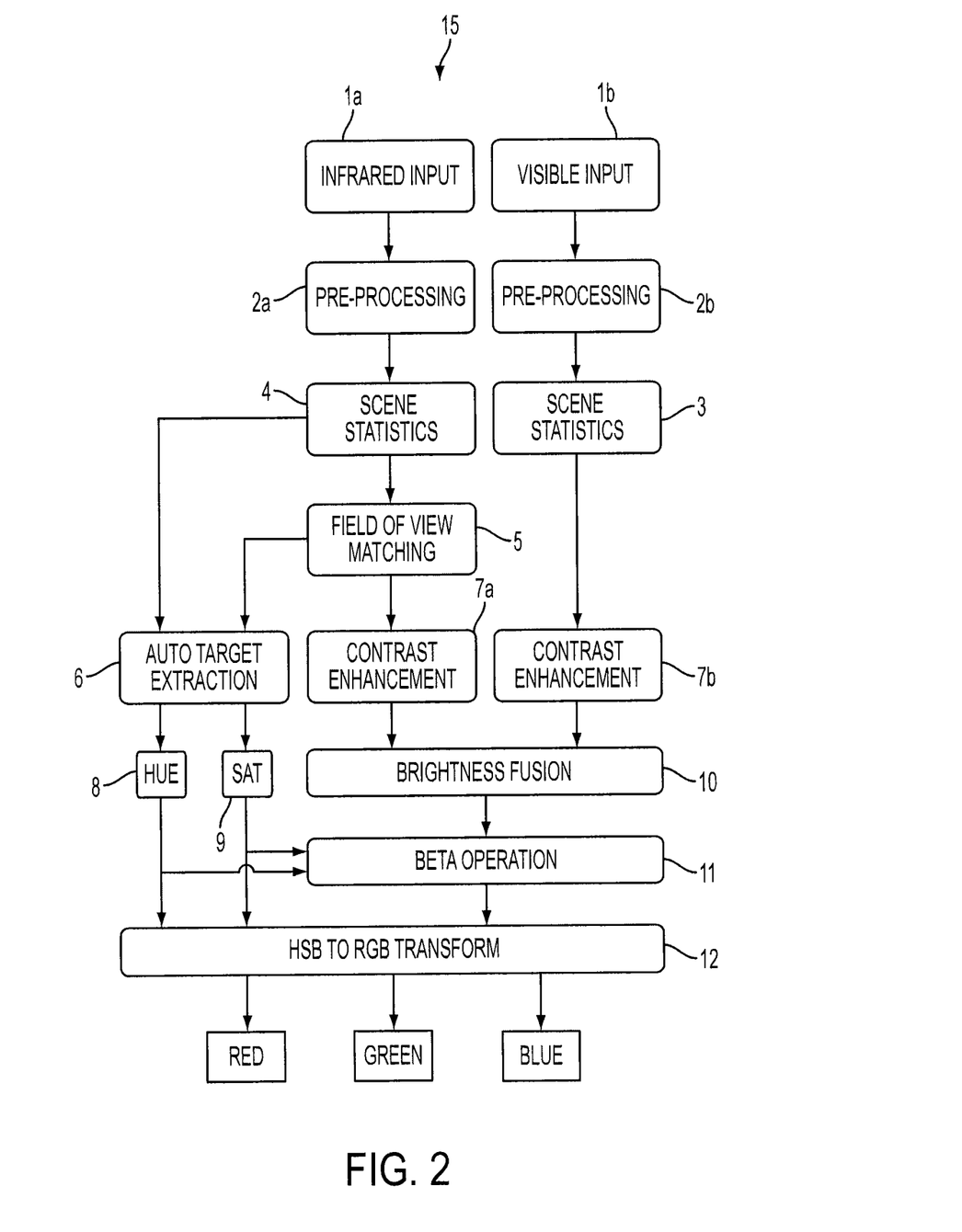
FIG. 2 is a flow diagram showing various modules executing steps for combining an infrared image and a visible image, in accordance with an embodiment of the present invention.

A method, in accordance with an embodiment of the present invention, is shown in FIG. 2, and is generally designated as 15. For explanation purposes, the method may be divided into three distinct blocks or chains. These are the IR processing block (elements 1a, 2a, 4, 5, 6 and 7a), the visible processing block (elements 1b, 2b, 3 and 7b), and the HSB processing block (elements 8, 9, 10, 11 and 12). Each processing block is responsible for forming a different facet of the output RGB (red, green and blue) image, as described below.

The IR processing block is responsible for non-uniformity calibration of the sensor and compensation of dead pixels in the sensor (element 2a); and gathering of scene statistics (element 4). The process continues with padding, cropping, or up-scaling (if the field-of-views (FOVs) do not match) (element 5). Lastly, the method enters contrast enhancement (element 7a), which is described in detail in U.S. application Ser. No. 12/949,969, filed by the present inventors, on Nov. 19, 2010, and is incorporated herein by reference in its entirety. As described therein, contrast enhancement provides dynamic range adjustment (DRA) for the intensities of the input pixels.

Operating in parallel with target enhancement, the method provides target extraction (element 6), which occurs prior to entering the HSB blocks. Details of the target extraction process is described in detail in U.S. application Ser. No. 12/949,965, filed by the present inventors, on Nov. 19, 2010, which is incorporated herein by reference in its entirety. As described therein, target extraction provides methods for extracting the target or several targets from the background ambient in the scene. It is the key for colorizing hot objects, as the process (element 6) separates objects that are warmer than ambient. In other words, pixels are flagged for colorization that are determined to be hotter than the scene background.

The visible processing block, similar to the IR processing block, is responsible for non-uniformity calibration of the sensor and compensation for dead pixels in the sensor (element 2b); and the gathering of scene statistics (element 3). Lastly, contrast enhancement (element 7b) is entered, which provides processing steps similar to the contrast enhancement (element 7a) of the IR channel, including DRA of the intensities of the visible input pixels. It will be appreciated that processing of the IR channel is performed in parallel with processing of the visible channel. It will further be appreciated that for both the IR and visible channels the image information from each sensor is stretched over its respective full dynamic range, using an adaptive temporal dynamic range adjustment (DRA) that may be combined with a TTC (tone transfer curve) look-up table gamma, as described in U.S. application Ser. No. 12/949,969, filed by the present inventors, on Nov. 19, 2010. The content of that application is incorporated herein by reference in its entirety.

Referring next to the HSB processing block (elements 8-12), the block is responsible for the fusion of the visible and IR images. This block also controls the overall quality of the final fused image. The saturation and hue processes (elements 8 and 9) control where colorization in the combined image occurs and the amount of color that is displayed in the final output image. To form the hue and saturation outputs, pixels from the detected targets (warm objects), incoming from the auto target extraction process (element 6) are passed into the hue and saturation processes separately. The hue process (element 9) compares the incoming pixel intensities of the target(s) to the ambient threshold determined by the auto target extraction process (element 6). The comparison estimates how much hotter the object(s) actually is (are) from the ambient threshold. Based upon the comparison, hues such as red for very hot, and yellow for low heat are provided as outputs.

A hue gradient is computed for each incoming pixel from the thermal camera that includes a corresponding colorization mask, $M_{color}$, value. The $M_{color}$ values are computed for each pixel based on a target threshold determination. The $M_{color}$ values are defined by Equation 1.1, as follows:

$$M_{color} = \begin{cases} 2 & I_{LWIR} \leq \tau_{cold} \\ 3 & I_{LWIR} \geq \tau_{hot} \\ 0 & o.w. \quad \text{(other wise)} \end{cases} \quad (1.1)$$

Where:
$\tau_{cold}$ is a threshold for cold pixels,
$\tau_{hot}$ is a threshold for hot pixels, and
$I_{LWIR}$ is the intensity gray value for the LWIR sensor.

The $\tau_{hot}$ is a threshold value for objects ('targets') considered above the scene's local ambient temperature. The method for determining this value is described in U.S. application Ser. No. 12/949,965, which is incorporated herein by reference in its entirety.

One may also be interested in temperatures below a scene's ambient temperature (as listed in case #3 of the table shown earlier). In such a case, the $\tau_{cold}$ may be a user defined input value. In addition, $\tau_{cold}$ may be computed just like $\tau_{hot}$ by reflecting a histogram about ambient and proceeding with the algorithm as described in U.S. application Ser. No. 12/949,965.

For those pixels in LWIR, in which $M_{color}$ is non-zero, an output hue is computed; otherwise (o.w.), the output hue is assigned the value zero (0). As shown in Equation 1.1, a colorization mask is assigned to cold pixels (mask value 2) and hot pixels (mask value 3). It will be appreciated, however, that if it is desired to colorize only pixels that are hot, the present invention may set the mask value to zero (0) for all $I_{LWIR}$ pixels that have intensity values less than $\tau_{hot}$.

Based on the mask values, the present invention computes a quantized image, $H_{image}$, defined by Equation 1.2, as follows:

$$H_{image} = \text{mod}(\tilde{H}_{image}, 1) \quad (1.2)$$

where:

$$\tilde{H}_{image} = \begin{cases} H_{0cold} + s_{cold}(r_{cold})I_q & \text{if } M_{color} = 2 \\ H_{0hot} + s_{hot}(r_{hot})I_q & \text{if } M_{color} = 3 \\ 0 & o.w. \end{cases} \quad (1.3a)$$

$$r_{cold} = \begin{cases} |H_{1cold} - H_{0cold}| & \text{if } d_{cold} = 0 \\ 1 - |H_{1cold} - H_{0cold}| & \text{if } d_{cold} = 1 \end{cases} \quad (1.3b)$$

$$r_{hot} = \begin{cases} |H_{1hot} - H_{0hot}| & \text{if } d_{hot} = 0 \\ 1 - |H_{1hot} - H_{0hot}| & \text{if } d_{hot} = 1 \end{cases} \quad (1.3c)$$

The value $I_q$ is a normalized $I_{LWIR}$ value (for a particular pixel) that depicts a delta between ambient and some predetermined boundary (described later).

Figure 3:
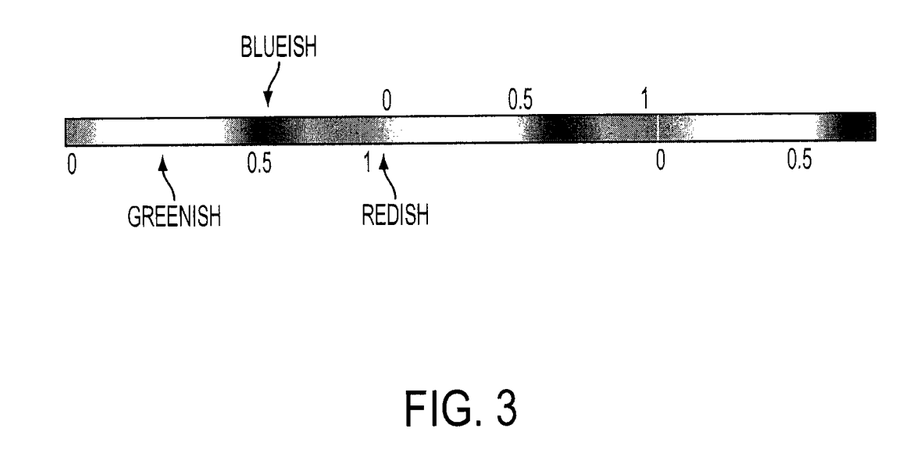
FIG. 3 shows an example of many hues ranging between 0 and 1 consisting of various combinations of green, blue and red, and repeating continuously over again, in accordance with an embodiment of the present invention.

The "mod( )" notation in Equation 1.2 is a modulus operator to allow for wrap-around of the color wheel. The $\tilde{H}_{image}$ is a variable that may take on values greater than 1.0. Instead of clipping the value, a modulus operator is used to determine the rollover value, as shown in FIG. 3. For example, if the value is 1.6, then the operator rolls the value over to 0.6. Notice that the hues repeat every cycle between 0 and 1, producing different shades of red, green and blue. While no color is shown in FIG. 3, it will be appreciated that at the value of approximately 0, the hue is deep red; at the value of approximately 0.3, the hue is deep green; at the value of approximately 0.6, the hue is deep blue; and at the value of approximately 1.0, the hue is deep red again.

The register controlled variables, used in Equations 1.2 and 1.3, are defined as follows:

$s_{cold}$ is a user selectable sign modifier, expressing either −1 or +1 (+1 causes an increasing hue value; −1 causes a decreasing hue value);

$d_{cold}$ is a user selectable range bit for the cold hue gradient;

$H_{0_{cold}}$ is a lower bounding hue value;

$H_{1_{cold}}$ is an upper bounding hue value;

$s_{hot}$ is a user selectable sign modifier, expressing either −1 or +1 (+1 causes an increasing hue value; −1 causes a decreasing hue value);

$d_{hot}$ is a user selectable range bit for the hot hue gradient;

$H_{0_{hot}}$ is a lower bounding hue value; and $H_{1_{hot}}$ is an upper bounding hue value.

The value $I_q$ is computed for each pixel. For convenience, any pixel in the LWIR image is expressed as I. An intermediate value, $I_a$, which is the distance between I and the scene ambient approximation, $\mu_{ambient}$, on either the hot or cold side of ambient (the scene ambient approximation, $\mu_{ambient}$, is derived in U.S. patent application Ser. No. 12/949,965). This is expressed in Equations 1.4 and 1.5, as follows:

$$I_{a_{hot}} = \max(0, I - \mu_{ambient}) \quad (1.4)$$

$$I_{a_{cold}} = \max(0, \mu_{ambient} - I) \quad (1.5)$$

Equations 1.4 and 1.5 are then used to define $I_q$, as shown in Equation 1.6:

$$Iq = \begin{cases} \frac{|m_{hue}(I_a - L_{min})N_{steps}|}{N_{steps}} & \text{if } L_{min} \le I_a \le L_{max} \\ 1 & \text{if } L_{max} \le I_a \\ 0 & o.w. \end{cases} \quad (1.6)$$

where:

$L_{min}$ is the lower bound for the (hot or cold, as appropriate) hue gradient Region I (see FIG. 4), defined as an absolute value of the delta from scene ambient approximation;

$L_{max}$ is the upper bound for the (hot or cold, as appropriate) hue gradient Region III (see FIG. 4), defined as an absolute value of the delta from scene ambient approximation ($L_{max}$ should be set to a value greater than $L_{min}$);

$m_{hue}$ is a scale factor for controlling the (hot or cold, as appropriate) hue gradient; and $N_{steps}$ is the number of quantization steps in the (hot or cold, as appropriate) hue gradient.

Figure 4:
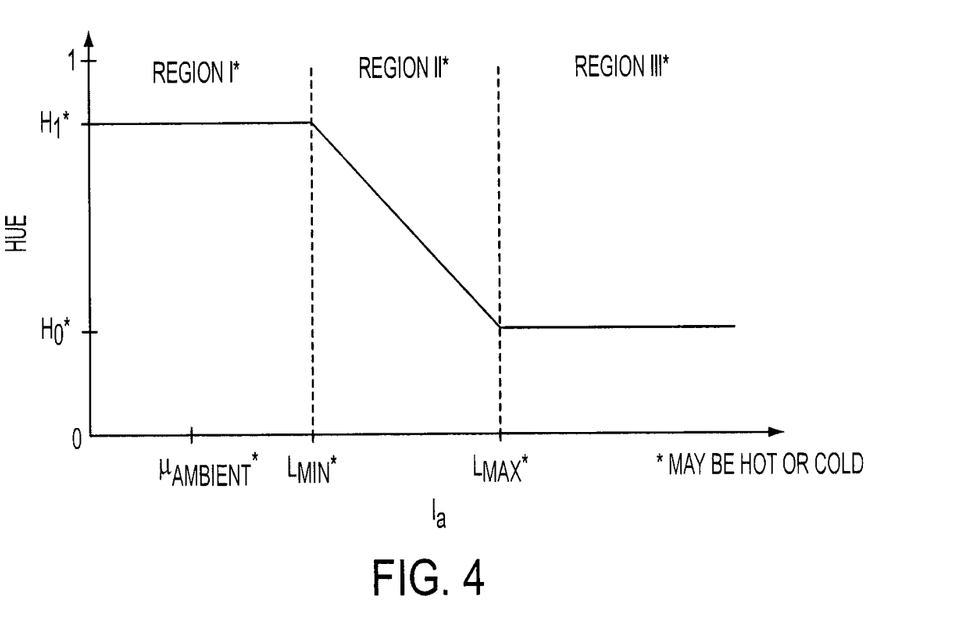
FIG. 4 is a plot of hue values provided by the present invention versus intermediate intensity values ($I_a$) of pixels having temperatures ranging in three different regions of I, II and III (these regions may be hot or cold), in accordance with an embodiment of the present invention.

The hue gradient Regions I, II and III are shown in FIG. 4. Notice that the three regions may be for hot pixels or cold pixels, as the situation may apply. Region I includes a fixed value of hue ($H_1$); and Region III has a fixed value of hue ($H_0$). Region II includes variable values of hue, H.

It will be understood that the values of $I_q$ in Equation 1.6 are clipped in the range of zero (0) to one (1). In addition, while $m_{hue}$ may be any value in the range of zero (0) to one (1), it should preferably be set to a value based on Equation 1.7, as follows:

$$m_{hue} = \frac{1}{L_{max} - L_{min}} \quad (1.7)$$

Thus far the hue operation (element 8 in FIG. 2) has been described. The saturation operation (element 9) will be discussed next. The saturation operation determines the amount of color to be added to the combined image. Saturation by the present invention may be set by either of two approaches. A first approach provides that for every pixel determined to be a target or an object of interest, a constant saturation value is used. Hot objects may have a constant value of $s_{hot}$ which may be applied to every designated pixel. Similarly, cold objects may have a constant value of $s_{cold}$ which may be applied to every designated pixel. (See Equations 1.2 and 1.3)

The second approach provides an adaptive procedure that produces a visually appealing image, when there exists a considerable number of hot or cold pixels in the image. The second approach is described below.

The number of non-zero pixels found in $M_{color}$ (see Equation 1.1) is used as the discriminator to differentiate between whether tip-off or recognition is more important. The number of hot pixels is counted separately from the number of cold pixels. The $N_{Shot}$ denotes the number of hot pixels, while $N_{Scold}$ represents the number of cold pixels. These values are determined when the $M_{color}$ mask is formed. As the number of hot and/or cold pixels increases, the colorization mode is assumed to have shifted from high saturation of small objects to de-saturation of larger objects. Thus, the saturation applied to the appropriate pixels may be reduced. The saturation values of hot and cold pixels are given by the values $$S_{hot}^{init} \text{ and } S_{cold}^{init},$$

respectively.

The $S_{hot}^{init}$ and $S_{cold}^{init}$ values are computed according to Equations 2.1 and 2.2, then temporally filtered using Equations 2.5 and 2.6.

Figure 5:
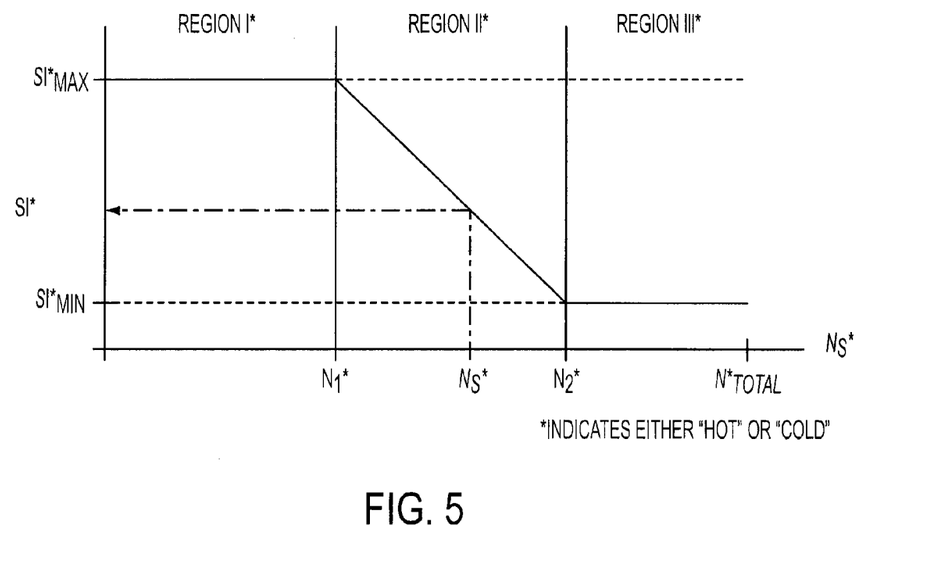
FIG. 5 is a plot of saturation values provided by the present invention versus counts of pixels having temperatures ranging in three different regions of I, II and III (these regions may be hot or cold), in accordance with an embodiment of the present invention.

A graphical representation of the computation performed to determine $$\text{the } S_{hot}^{init}$$

$$\text{or } S_{cold}^{init}$$

values is shown in FIG. 5. Note that the y-axis represents the $$S_{hot}^{init} \text{ or } S_{cold}^{init}$$

values (shown as SI*, where the * denotes either hot or cold, respectively). The x-axis represents numbers of pixels (shown as N*, where the * denotes either hot or cold, respectively) that are computed by the various accumulators counting pixels from the thermal imager.

The following is Equation 2.1:

$$S_{hot}^{init} = \begin{cases} S_{hot}^{max} & N_{S_{hot}} \leq N_{hot}^{min} & \text{(Region I)} \\ m_{acar_{hot}}(N_{hot}^{max} - N_{S_{hot}}) + S_{hot}^{min} & N_{hot}^{min} < N_{S_{hot}} < N_{hot}^{max} & \text{(Region II)} \\ S_{hot}^{min} & N_{S_{hot}} \geq N_{hot}^{max} & \text{(Region III)} \end{cases}$$

The following is Equation 2.2:

$$S_{cold}^{init} = \begin{cases} S_{hot}^{max} & N_{S_{cold}} \leq N_{cold}^{min} & \text{(Region I)} \\ m_{acar_{cold}}(N_{cold}^{max} - N_{S_{cold}}) + S_{cold}^{min} & N_{cold}^{min} < N_{S_{cold}} < N_{cold}^{max} & \text{(Region II)} \\ S_{cold}^{min} & N_{S_{cold}} \geq N_{cold}^{max} & \text{(Region III)} \end{cases}$$

The following are the definitions of the variables in Equation 2.1:

| Variable | Description |
| --- | --- |
| $S_{hot}^{init}$ | Saturation value for hot pixels |
| $S_{hot}^{max}$ | Upper bound on $S_{hot}^{init}$ |
| $S_{hot}^{min}$ | Lower bound on $S_{hot}^{init}$ |
| $N_{S_{hot}}$ | Number of pixels with values greater than the target threshold $\tau_{hot}$ |
| $N_{hot}^{min}$ | Number of pixels defining the lower bound of Region II of the $S_{hot}^{init}$ |
| $N_{hot}^{max}$ | Number of pixels defining the upper bound of Region II of the $S_{hot}^{init}$ |
| $m_{acar_{hot}}$ | Slope of Region II of the $S_{hot}^{init}$ |

The following are the definitions of the variables in Equation 2.2:

| Variable | Description |
| --- | --- |
| $S_{cold}^{init}$ | Saturation for cold pixels |
| $S_{cold}^{max}$ | Upper bound on $S_{cold}^{init}$ |
| $S_{cold}^{min}$ | Lower bound on $S_{cold}^{init}$ |
| $N_{S_{cold}}$ | Number of pixels with values greater than the target threshold $\tau_{cold}$ |
| $N_{cold}^{min}$ | Number of pixels defining the lower bound of Region II of the $S_{cold}^{init}$ |
| $N_{cold}^{max}$ | Number of pixels defining the upper bound of Region II of the $S_{cold}^{init}$ |
| $m_{acar_{cold}}$ | Slope of Region II of the $S_{cold}^{init}$ |

The values $$N_{hot}^{min}, N_{cold}^{min}, N_{hot}^{max} \text{ and } N_{cold}^{max}$$

for each pixel are parameters that are computed once (either by the algorithm developers or by a microcontroller) and then stored in registers for future use. Typically, they may be derived from percentages of a scene's total possible pixels. These values define the number of colorized pixels at which, respectively, the $$S_{hot}^{init} \text{ or } S_{cold}^{init}$$

values begin to decrease to values less than $$S_{hot}^{max} \text{ or } S_{cold}^{max},$$

respectively (see the intersection between Region I and Region II in FIG. 5); and the point at which the $$S_{hot}^{init} \text{ or}$$

$$S_{cold}^{init}$$

values stop decreasing and take on the value of $$S_{hot}^{min} \text{ and } S_{cold}^{min},$$

respectively (see the intersection between Region II and Region III in FIG. 5).

The slope (for either hot or cold pixels) of Region II in FIG. 5 is an adaptive slope ($m_{acar}$) which is computed by Equations 2.3 and 2.4. The slope is given by the variables $$m_{acar_{hot}} \text{ and } m_{acar_{cold}}$$

(adaptive color assistant reduction), as follows:
The following is Equation 2.3:

$$m_{acar_{hot}} = \frac{S_{hot}^{max} - S_{hot}^{min}}{N_{hot}^{max} - N_{S_{hot}}}$$

The following is Equation 2.4:

$$m_{acar_{cold}} = \frac{S_{cold}^{max} - S_{cold}^{min}}{N_{cold}^{max} - N_{S_{cold}}}$$

After the $$S_{hot}^{init} \text{ or } S_{cold}^{init}$$

values are determined using Equations 2.1 and 2.2, they are filtered using an Infinite Impulse Response (IIR) filter. The IIR filter provides a smooth transition between changing $$S_{hot}^{init} \text{ or } S_{cold}^{init}$$

values. Thus, the saturation value for frame i is determined from the initial value, $S_{hot}^{init}$, or $S_{cold}^{init}$ computed for frame i and the saturation value from the prior frame (i-1), namely $S_{hot(i-1)}^{init}$, or $S_{cold(i-1)}^{init}$, as detailed in Equations 2.5 and 2.6:

The following is Equation 2.5:

$$S_{hot^i} = S_{hot}^{init}(1 - \alpha_{hot}) + (S_{hot^{i-1}})(\alpha_{hot})$$

The following is Equation 2.6:

$$S_{cold^i} = S_{cold}^{init}(1 - \alpha_{cold}) + (S_{cold^{i-1}})(\alpha_{cold})$$

where $\alpha_{hot}$ and $\alpha_{cold}$ are IIR filter coefficients entered by the user.

Turning next to the brightness fusion block (element 10) in FIG. 2, it will be appreciated that the present invention may use any one of the following approaches for combining two images, namely, fusion based on frequency relationships of the two images, or fusion based on the spatial relationships of the two images. Another approach may be based on either uniform fusion or variance-based fusion. One approach is described in U.S. application Ser. No. 12/846,086, titled "Method for Combining Two Image Data Sets Using Fixed Distribution" filed on Jul. 29, 2010, by the same inventors. The description in that application is incorporated herein by reference in its entirety.

The beta block, β operation (element 11 in FIG. 2), will now be described. The β operation enhances and intensifies the color of either hot or cold thermal objects that are dark in the fused intensity image. Thus, the β operation lightens pixels of the fused image that are determined to be in temperature extremes (either hot or cold). This lightening process ensures that the hue provided by the addition of color is the same for all pixels, regardless of the final tonal character of the fused image.

Figure 6:
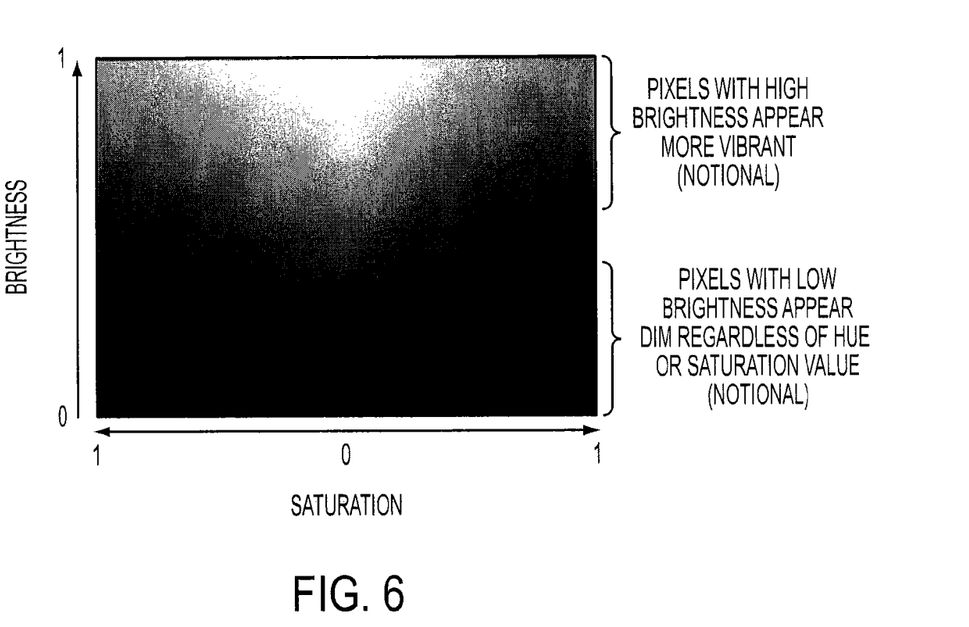
FIG. 6 is a functional diagram showing brightness as a function of saturation values, in which the pixels with high brightness appear more vibrant than the pixels with low brightness.

The beta block operation uses a hue-saturation-brightness (HSB) color-space. As such, for a given saturation value (saturation input >0.0), when the brightness channel output (from element 10, for example) for a pixel approaches "0", the pixel has a tendency to become muddy, dark gray, or blackish, regardless of hue or saturation values. This makes target or object color indication difficult to see. When the brightness channel is higher (e.g. saturation input close to 1), however, colors are more vibrant, giving the human visual response a quicker and a faster tip-off, as shown for example in FIG. 6, where only two exemplary colors are presented.

The β operation is based on Equations 3.1 and 3.2, as follows:

$$\beta_{out} = (1 - (S_{min})s_{input})\beta_{in} + (S_{min})s_{input} \quad (3.1)$$

$$\beta_{final} = \begin{cases} \beta_{in} & \text{if } M_{color} = 0 \\ \beta_{out} & \text{otherwise} \end{cases} \quad (3.2)$$

where:
$\beta_{in}$ is the incoming normalized contrast-enhanced fused brightness image (from element 10 in FIG. 2);
$\beta_{out}$ is an intermediate output adjusted brightness image;
$S_{min}$ is a user selectable minimum saturation variable between 0.0-1.0;
$s_{input}$ is an input saturation image from element 9 of FIG. 2 and is typically derived from Equations 2.5 and 2.6;
$\beta_{final}$ is the final brightness image, prior to RGB color conversion; and
$M_{color}$ is the color mask, as defined in Equation 1.1.

Figure 7:
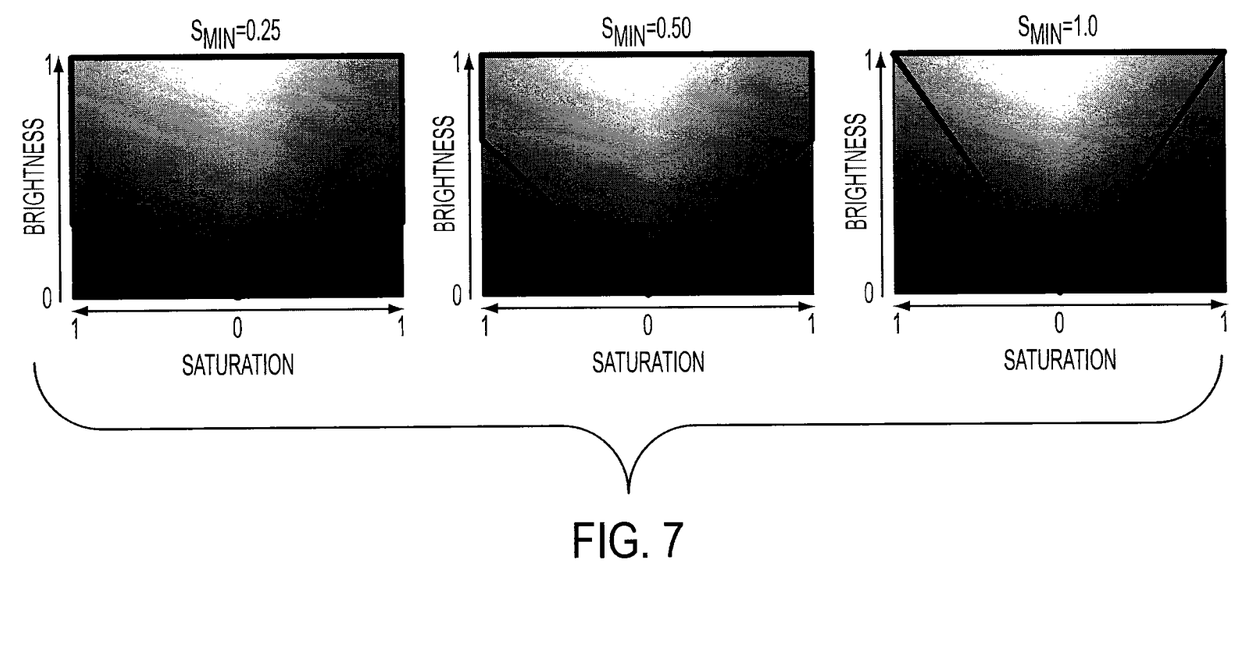
FIG. 7 is a functional diagram showing brightness as a function of saturation values for selected ranges of minimum saturation values ($S_{min}$) of 0.25, 0.50 and 1.0, in accordance with an embodiment of the present invention.

The effects of changing $S_{min}$ are best illustrated by comparing a possible color gamut for two exemplary hues, as shown in FIG. 7. As $S_{min}$ increases, dark pixels in the fused grayscale image are pushed up lighter and lighter. As a consequence, the dynamic range for those pixels at full saturation gets smaller, leading to decreased detail in the brightness image. A compromise setting by the user may be to select the $S_{min}$ value equal to 0.25.

Figure 8:
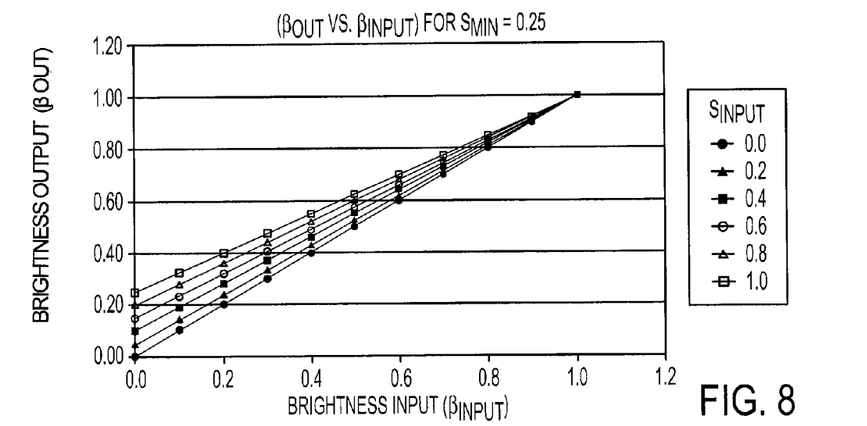
FIGS. 8-10 are plots of output brightness versus input brightness for selected ranges of minimum saturation values ($S_{min}$) of 0.25, 0.50 and 1.0, in accordance with an embodiment of the present invention.
Figure 9:
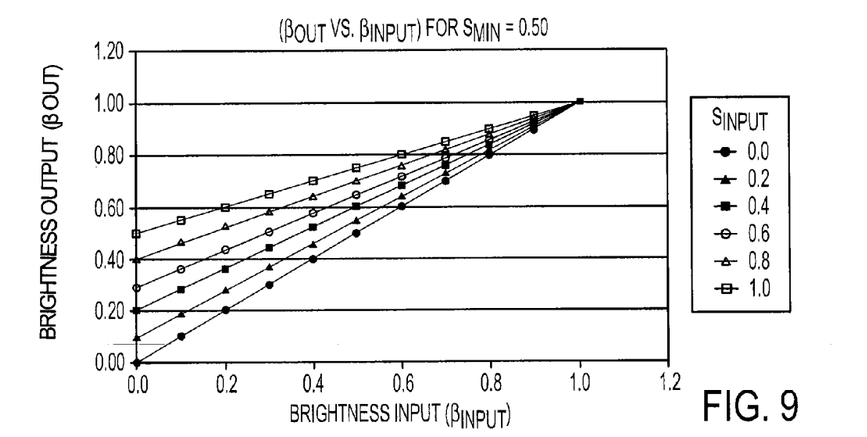
Figure 10:
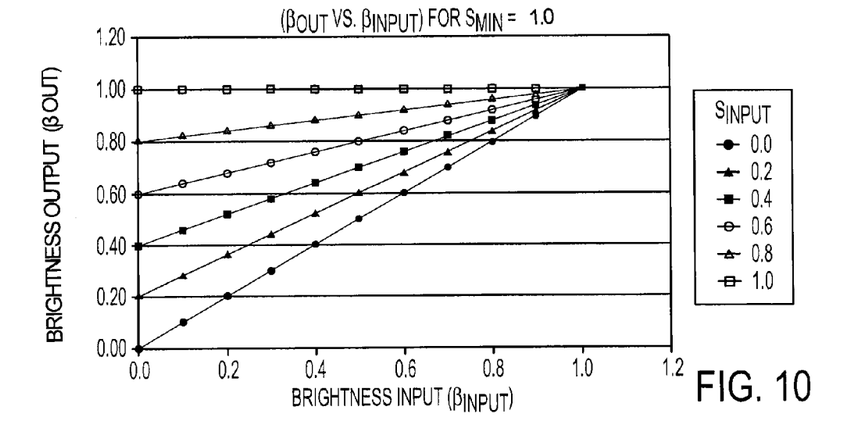

FIGS. 8, 9 and 10 depict a series of plots for the outputs provided by the beta operation (element 11 in FIG. 2) based on Equation 3.1. FIG. 8 shows the beta operation output for a range of input brightness ($\beta_{in}$) with the variable $S_{min}$ set equal to 0.25. FIG. 9 shows the beta operation output for a range of input brightness ($\beta_{in}$) with the variable $S_{min}$ set equal to 0.50. Finally, FIG. 10 shows the beta operation output for a range of input brightness ($\beta_{in}$) with the variable $S_{min}$ set equal to 1.0. Notice how the brightness of the output is pushed up as the variable $S_{min}$ is increased.

The hue-saturation-brightness (HSB) is the chosen color space of the present invention. As shown in FIG. 2, a transformation from HSB to red-green-blue (RGB) color space is performed by the conversion block (element 12). The purpose of the HSB-to-RGB conversion block is to facilitate display and/or storage of the final combined image. The conversion from HSB color space to RGB color space is performed using Equations 4.1-4.6, as follows:

$$h_f = \text{floor}(6 \cdot H) \quad (4.1)$$

$$f = (6 \cdot H) - h_f \quad (4.2)$$

$$p = B(1-S) \quad (4.3)$$

$$q = B(1-f \cdot S) \quad (4.4)$$

$$t = B(1-(1-f) \cdot S) \quad (4.5)$$

$$(R, G, B) = \text{floor}\left((2^n - 1) \begin{cases} (B, t, p), & \text{if } h_f = 0 \\ (q, B, p), & \text{if } h_f = 1 \\ (p, B, t), & \text{if } h_f = 2 \\ (p, q, B), & \text{if } h_f = 3 \\ (t, p, B), & \text{if } h_f = 4 \\ (B, p, q), & \text{if } h_f = 5 \end{cases}\right) \quad \text{eq. 4.6}$$

where:
H is the input normalized hue image,
S is the input normalized saturation image,
B is the input normalized brightness image,
R is the output red color channel, G is the output the green color channel,
B is the output blue color channel, and
n is output bit depth.

The output provided by Equation 4.6 is an RGB color plane image that may be sent to a display device or a storage medium.

The present invention may be used for image fusion, data-fusion, image processing, or image enhancement.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for fusing two images comprising:
    separately receiving (a) intensity values of a thermal image and (b) intensity values of a visual image;
    separately adjusting contrast of (a) the intensity values of the thermal image and (b) the intensity values of the visual image;
    combining (a) contrast adjusted intensity values of the thermal image and (b) contrast adjusted intensity values of the visual image, to form combined brightness values;
    separating a target region from a background region in the thermal image;
    assigning hue values to the target region in the thermal image, after separating the target region from the background region in the thermal image; and
    displaying a fused image, based on the assigned hue values obtained in the thermal image and the combined brightness values;
    wherein assigning hue values to the target region in the thermal image includes:
    computing an ambient threshold value for the target region,
    assigning a hue value of zero to a pixel from the thermal image, if the pixel has an intensity value less than the ambient threshold value, and
    assigning a hue value of non-zero to a pixel from the thermal image, if the pixel has an intensity value greater than or equal to the ambient threshold value.

2. The method of claim 1 further including:
    transforming the combined brightness values and the hue values into the fused image having red, green and blue (RGB) color spaces.

3. The method of claim 1 wherein assigning a hue value of non-zero to a pixel from the thermal image includes:
    computing a quantized hue value, based on a number of steps between a lower hue value and an upper hue value, and
    the number of steps, the lower hue value and the upper hue value are controllable values.

4. The method of claim 1 further including:
    assigning saturation values to the target region in the thermal image, after separating the target region from the background region in the thermal image; and
    transforming the hue values, the saturation values, and the combined brightness values (HSB values) into the fused image having RGB color spaces.

5. The method of claim 4 wherein assigning saturation values to the target region in the thermal image includes:
    assigning a fixed saturation value to each pixel in the target region.

6. The method of claim 4 wherein assigning saturation values to the target region in the thermal image includes:
    computing an ambient threshold value for the target region,
    counting the number of pixels in the target region having intensity values greater than the ambient threshold value, and
    computing a saturation value for each pixel in the target region based on the counted number of pixels.

7. The method of claim 6 wherein computing the saturation value includes:
    computing a point on a graph of saturation values versus counts of pixels, the graph having constant lower and upper saturation values and varying saturation values between minimum and maximum counts of pixels.

8. A method for fusing two images comprising:
    separately receiving (a) intensity values of a thermal image and (b) intensity values of a visual image;
    separately adjusting contrast of (a) the intensity values of a the thermal image and (b) the intensity values of the visual image;
    combining (a) contrast adjusted intensity values of the thermal image and (b) contrast adjusted intensity values of the visual image, to form combined brightness values;
    separating a target region from a background region in the thermal image;
    assigning hue values to the target region in the thermal image, after separating the target region from the background region in the thermal image;
    displaying a fused image, based on the assigned hue values obtained in the thermal image and the combined brightness values;
    assigning saturation values to the target region in the thermal image, after separating the target region from the background region in the thermal image; and
    modifying the combined brightness values, based on the saturation values assigned to the target region.

9. The method of claim 8 wherein modifying the combined brightness values includes:
    increasing the combined brightness values for pixels determined to be dark as the saturation values increase; and
    maintaining, without increase, the combined brightness values for pixels determined to be dark as the saturation values are close to zero.

10. An imaging system comprising:
    a camera providing a visual grayscale image,
    a camera providing a thermal grayscale image, and
    a processor for:
    (a) combining the visual grayscale image and the thermal grayscale image to form a combined grayscale image,
    (b) separating, based on an ambient temperature value, target pixels from background pixels in the thermal grayscale image,
    (c) assigning a hue value for each of the target pixels,
    (d) assigning a saturation value for each of the target pixels, and
    (e) transforming the combined grayscale image into a final color image, based on the hue value and the saturation value assigned to each of the target pixels,
    wherein
    the processor includes a beta module for modifying the combined a scale image, based on the assigned saturation values in step (d).

11. The imaging system of claim 10 including:
    a display for displaying the final color image.

12. The imaging system of claim 10 including:
    a storage device for storing the final color image.

13. The imaging system of claim 10 wherein
    the processor includes a transform module for transforming the combined grayscale image into a red-green-blue (RGB) color space.

14. The imaging system of claim 10 including:

a module for determining the ambient temperature value of the thermal grayscale image, wherein the beta module lightens a dark pixel, when the dark pixel has a temperature value higher than the ambient temperature value.

15. The imaging system of claim 14 wherein the ambient temperature value includes a hot threshold or a cold threshold, the beta module lightens a dark pixel, when the dark pixel has a temperature value higher than the hot threshold, and the beta module lightens a dark pixel, when the dark pixel has a temperature value lower than the cold threshold.

16. A processor for combining two images comprising:

a first contrast enhancement module for adjusting dynamic range of pixel intensities of a first image, a second contrast enhancement module for adjusting dynamic range of pixel intensities of a second image, a brightness fusion module for combining the pixel intensities of the first and second images to form a fused image, a threshold module for determining an ambient temperature value of the pixel intensities of the first image, and a beta module for modifying the pixel intensities of the fused image, based on ambient temperature values of the pixel intensities of the first image.

17. The processor of claim 16 including:

a saturation module for assigning saturation values for the pixel intensities of the first image, a hue module for assigning hue values for the pixel intensities of the first image, and a transformation module for transforming the fused image into red-green-blue (RGB) color spaces, based on the saturation and hue values.

18. The processor of claim 16 wherein the beta module increases the pixel intensities of the fused image, if the pixel intensities of the fused image are hotter than the ambient temperature values.

* * * * *